United States Patent
Fujita et al.

(10) Patent No.: US 9,357,276 B2
(45) Date of Patent: May 31, 2016

(54) DIGITAL BROADCAST METHOD

(71) Applicant: NTT Electronics Corporation, Yokohama-shi, Kanagawa (JP)

(72) Inventors: Hiromi Fujita, Yokohama (JP); Hidenori Nagayama, Yokohama (JP)

(73) Assignee: NTT ELECTRONICS CORPORATION, Yokohama (JP)

( * ) Notice: Subject to any disclaimer, the term of this patent is extended or adjusted under 35 U.S.C. 154(b) by 0 days.

(21) Appl. No.: 14/379,246

(22) PCT Filed: Sep. 21, 2012

(86) PCT No.: PCT/JP2012/074196
§ 371 (c)(1),
(2) Date: Aug. 15, 2014

(87) PCT Pub. No.: WO2013/128696
PCT Pub. Date: Sep. 6, 2013

(65) Prior Publication Data
US 2015/0163567 A1    Jun. 11, 2015

(30) Foreign Application Priority Data

Mar. 1, 2012 (JP) ................................ 2012-045059

(51) Int. Cl.
*H04N 21/643* (2011.01)
*H04N 21/438* (2011.01)
*H04N 21/434* (2011.01)
*H04N 21/426* (2011.01)
*H04N 21/8547* (2011.01)
*H04N 21/2389* (2011.01)
*H04L 29/06* (2006.01)

(52) U.S. Cl.
CPC ........ *H04N 21/8547* (2013.01); *H04L 65/4076* (2013.01); *H04L 65/607* (2013.01); *H04L 65/608* (2013.01); *H04N 21/2389* (2013.01)

(58) Field of Classification Search
CPC .................... H04N 21/2363; H04N 21/64322; H04N 21/6373; H04N 21/8547; H04N 21/2389; H04N 21/6437; H04N 21/4381; H04N 21/42604; H04N 21/4345
See application file for complete search history.

(56) References Cited

U.S. PATENT DOCUMENTS

| | | | |
|---|---|---|---|
| 2004/0052209 A1* | 3/2004 | Ortiz | ............................ 370/230 |
| 2007/0076764 A1* | 4/2007 | Kawada et al. | ............... 370/503 |
| 2010/0172374 A1* | 7/2010 | Lemonnier | ....... H04L 29/06027 370/473 |

FOREIGN PATENT DOCUMENTS

| | | |
|---|---|---|
| JP | 2007-104085 A | 4/2007 |
| JP | 2010-041494 A | 2/2010 |
| JP | 2010-045469 A | 2/2010 |

OTHER PUBLICATIONS

PCT/JP2012/074196—International Search Report—Oct. 30, 2012.
International Preliminary Report on Patentability dated Sep. 12, 2014 issued in International Patent Application No. PCT/JP2012/074196.

* cited by examiner

*Primary Examiner* — Ricky Chin
*Assistant Examiner* — Aklil Tesfaye
(74) *Attorney, Agent, or Firm* — Arent Fox LLP

(57) ABSTRACT

A TTS preparation processing section attaches a time stamp to each of packets in an MPEG-2 TS (Transport Stream) to convert the MPEG-2 TS into an MPEG-2 TTS (Time-stamped Transport Stream). A grouping section collects a predetermined number of packets in the MPEG-2 TTS to form a group. A null packet removal section removes null packets from the group. A transmitting section shifts the MPEG-2 TTS packets in the group, from which the null packet has been removed, frontward to convert the MPEG-2 TTS packets into an RTP (Real-time Transport Protocol) packet and transmits the RTP packet to a communication line.

2 Claims, 5 Drawing Sheets

DIGITAL BROADCAST METHOD

TECHNICAL FIELD

The present invention relates to a digital broadcast method using a communication line.

BACKGROUND ART

In a case where a HDTV broadcast (high-definition moving picture information) of multiplexed video and audio data in accordance with MPEG-2 TS (Transport Stream) is made in digital broadcasting using a communication line such as the Internet, the required transfer rate is high (e.g., equal to or higher than 24 Mbps) and, therefore, reducing the transfer rate by deleting information (such as null packets) not relating directly to the contents is conceivable.

In the case of MPEG-2 TS transmission at a fixed bit rate (CBR: constant bitrate), timing synchronization on the receiving side is possible in a model of transmission at a constant rate in an environment free from the influence of jitter or packet loss. If in this model the average rate is reduced simply by deleting null packets, receiving transmitted information in correct timing synchronization is difficult.

In such circumstances, a method in which MPEG-2 TS packets are converted into MPEG-2 TTS (Time-stamped Transport Stream) packets by attaching a time stamp to each of the MPEG-2 TS packets and null packets are thereafter removed has been proposed (see, for example, Patent Literature 1). Timing can be accurately synchronized on the receiving side by means of the time stamps in the MPEG-2 TTS, thereby enabling deletion of null packets on the transmitting side. The average rate of data transfer through the communication line can thereby be substantially reduced.

CITATION LIST

Patent Literature

Patent Literature 1: Japanese Patent Laid-Open No. 2007-104085

SUMMARY OF INVENTION

Technical Problem

A data stream in accordance with MPEG-2 TTS is converted into RTP (Real-time Transport Protocol) packets formed by attaching a header to each of groups of predetermined numbers of MPEG-2 TTS packets, and the RTP packets are transmitted from the transmitting side to a communication line. Conventionally, null packets are deleted on the transmitting side and non-null MPEG-2 TTS packets are fully packed to the upper limit of each RTP packet. Therefore, preparation timing variations of RTP packets occur on the transmitting side, and there is a need to secure a buffer and absorb arrival time variations of the RTP packets on the receiving side. There is also a problem of the increased delay time on the receiving side.

The present invention has been achieved to solve the above-described problems, and an object of the present invention is to obtain a digital broadcast method that eliminates the need for an additional buffer on the receiving side and enables reducing the delay time on the receiving side and substantially reducing the average rate of data transfer through a communication line.

Means for Solving the Problems

A digital broadcast method according to the present invention includes: attaching, by a TTS preparation processing section, a time stamp to each of packets in an MPEG-2 TS (Transport Stream) to convert the MPEG-2 TS into an MPEG-2 TTS (Time-stamped Transport Stream); collecting, by a grouping section, a predetermined number of packets in the MPEG-2 TTS to form a group; removing, by a null packet removal section, a null packet from the group; and shifting, by a transmitting section, the MPEG-2 TTS packets in the group, from which the null packet has been removed, frontward to convert the MPEG-2 TTS packets into an RTP (Real-time Transport Protocol) packet and transmitting the RTP packet to a communication line.

Advantageous Effects of Invention

The present invention makes it possible to eliminate the need for an additional buffer on the receiving side, reduce the delay time on the receiving side and substantially reduce the average rate of data transfer through a communication line.

DESCRIPTION OF EMBODIMENTS

Figure 1:
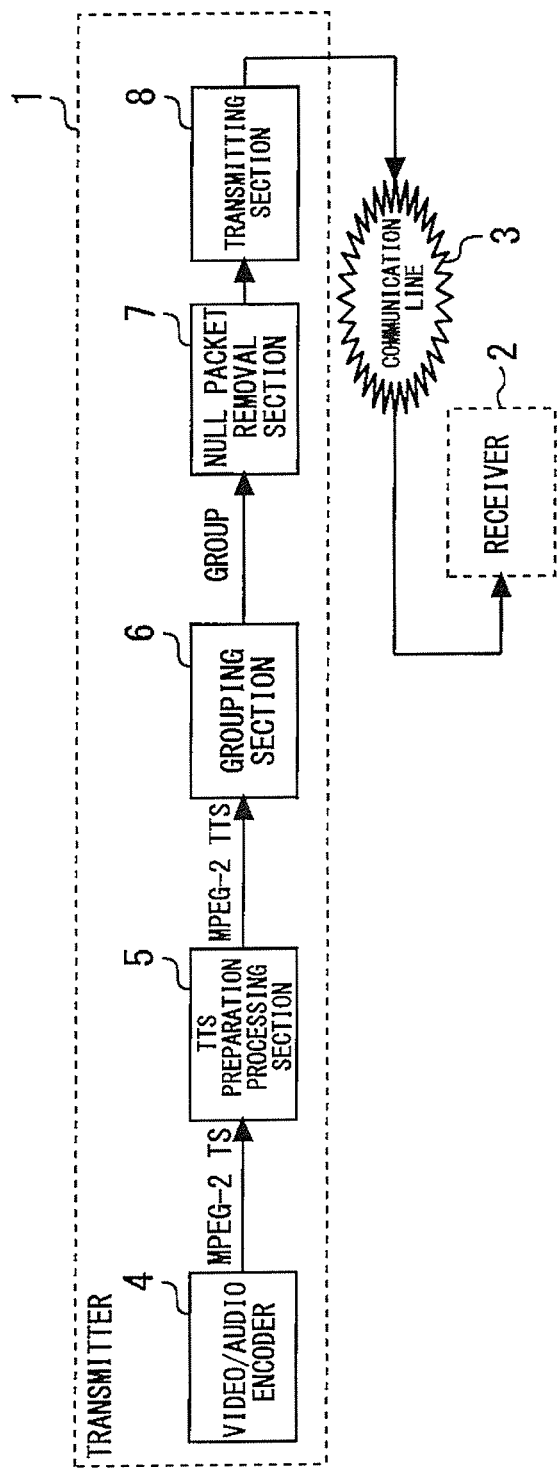
FIG. 1 is a diagram showing a digital broadcasting system according to an embodiment of the present invention.

FIG. 1 is a diagram showing a digital broadcasting system according to an embodiment of the present invention. This system is divided into a transmitter 1 and a receiver 2. RTP packets transmitted by the transmitter 1 are received by the receiver 2 through a communication line 3 such as the Internet. The transmitter 1 is provided with a video/audio encoder (compression and multiplexing device) 4, a TTS preparation processing section 5, a grouping section 6, a null packet removal section 7 and a transmitting section 8.

Figure 2:
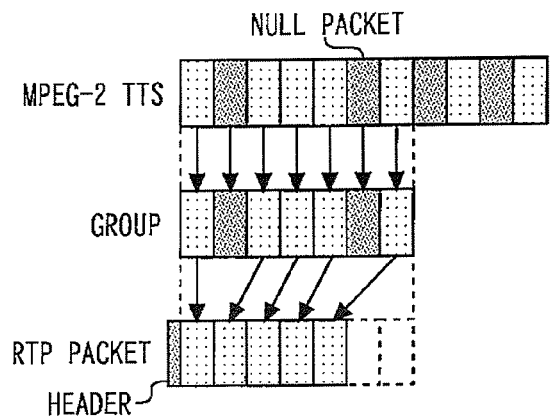
FIG. 2 is a diagram showing an example of preparation of an RTP packet according to a method in the embodiment of the present invention.
Figure 3:
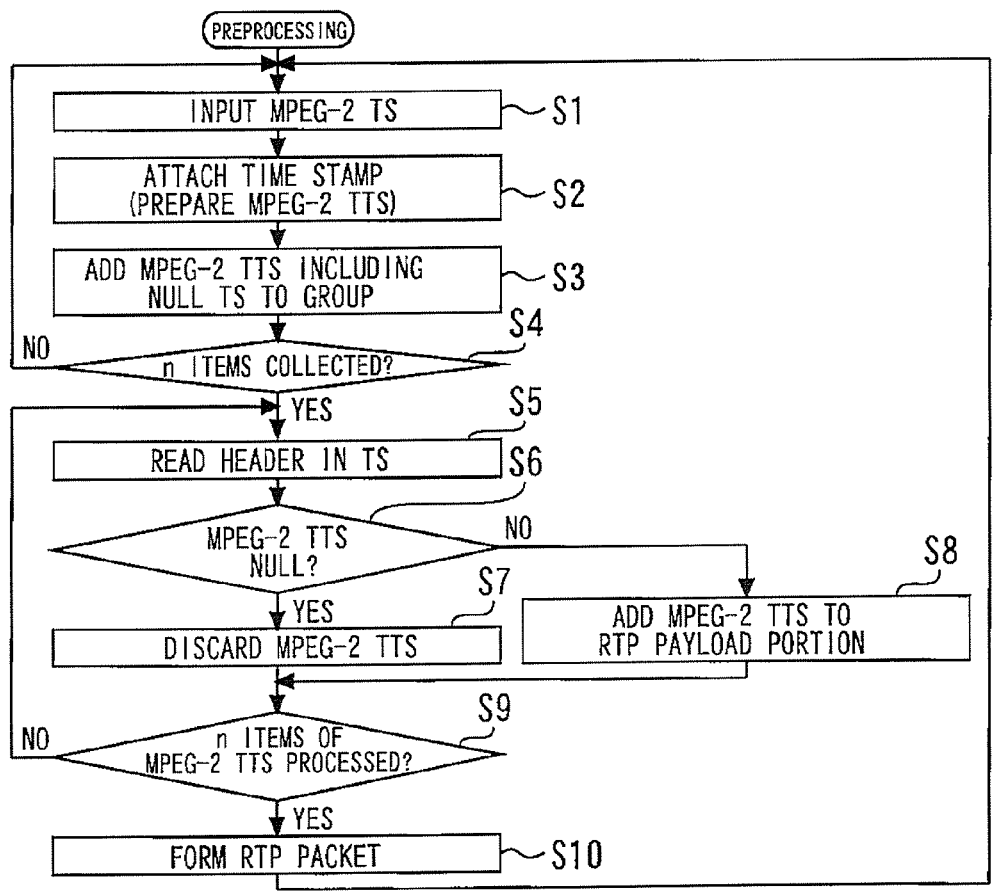
FIG. 3 is a flowchart of a digital broadcast method according to the embodiment of the present invention.

FIG. 2 is a diagram showing an example of preparation of an RTP packet according to a method in the embodiment of the present invention. FIG. 3 is a flowchart of a digital broadcast method according to the embodiment of the present invention. The digital broadcast method according to the embodiment will be described with reference to these figures.

First, the video/audio encoder (compression and multiplexing device) 4 outputs an MPEG-2 TS ordinarily used for a broadcast. When the MPEG-2 TS is encoded from original video data at a broadcasting station or the like, null packets having no video and other contents are inserted in the MPEG-2 TS for adjustment of timing synchronization.

Next, the TTS preparation processing section 5 converts the MPEG-2 TS into an MPEG-2 TTS by attaching a time stamp to each of packets in the MPEG-2 TS. More specifically, the MPEG-2 TS is input to the TTS preparation processing section 5 (step S1), and time information corresponding to the encoding time, whose information is received from the video/audio encoder (compression and multiplexing device) 4, is attached as a time stamp to a packet in the MPEG-2 TS (step S2).

Next, the grouping section 6 adds the MPEG-2 TTS packet to a group (step S3). The grouping section 6 repeats steps S1 to S3 until a predetermined n number of MPEG-2 TTS packets is reached (step S4).

Next, the grouping section 6 delivers the group of n number of packets to the null packet removal section 7. The null packet removal section 7 deletes unnecessary null packets from the group of n number of packets. More specifically, a header in the time-stamped TS is read (step S5) and the packet ID (PID) therein is checked (step S6). If the PID is "PID=1FFF" designating a null packet, the corresponding TTS packet is removed (step S7) and the process returns to step S5. On the other hand, if the PID is not "PID=1FFF", the corresponding TTS packet contains valid information and the MPEG-2 TTS is therefore added to the RTP payload portion (step S8). Steps S5 to S8 are repeated until the n number of packets of the MPEG-2 TTS included in one group are processed (step S9).

Next, the transmitting section 8 closely packs the MPEG-2 TTS packets in the group from which the null packet has been removed by shifting some of the MPEG-2 TTS packets frontward, converts the MPEG-2 TTS packets into an RTP packet by attaching a header, and transmits the RTP packet to the communication line 3 (step S10).

Figure 4:
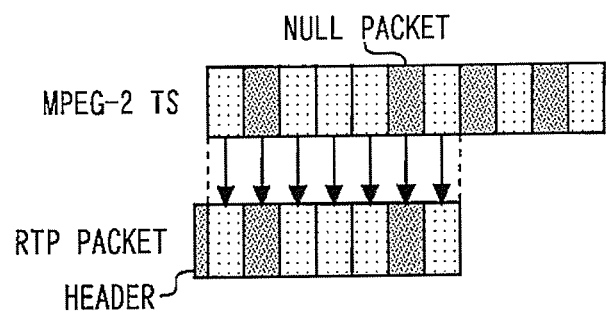
FIG. 4 is a diagram showing an example of preparation of an RTP packet according to a method in comparative example 1.
Figure 5:
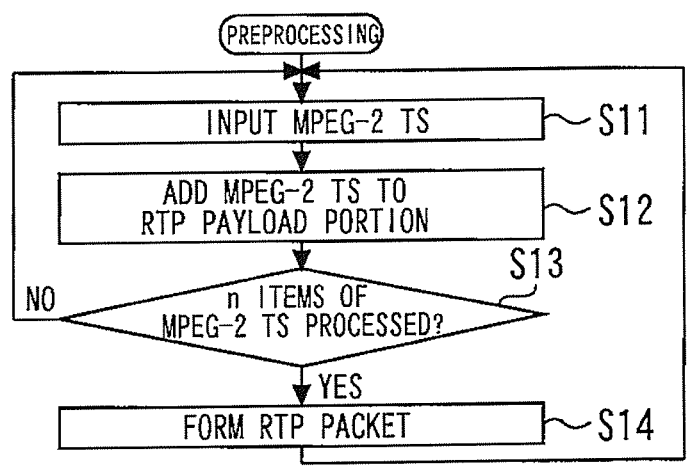
FIG. 5 is a flowchart of a digital broadcast method according to comparative example 1.

The advantage of the present embodiment will be described by making comparison with comparative examples 1 and 2. FIG. 4 is a diagram showing an example of preparation of an RTP packet according to a method in comparative example 1. FIG. 5 is a flowchart of a digital broadcast method according to comparative example 1. In comparative example 1, MPEG-2 TS packets are packed to the upper limit of one RTP packet without discriminating null packets (steps S11 to S14). No variation therefore occurs in timing of preparation of RTP packets. As a result, in the case of CBR transmission of the MPEG-2 TS, timing can be synchronized on the receiving side in an environment free from the influence of jitter or packet loss.

On the other hand, HDTV broadcasting in digital broadcasting using a communication line such as the Internet will be considered. A high transfer rate is required for HDTV broadcasting. This transfer rate may be reduced by deleting null packets. Deletion of null packets, however, cannot be performed because it entails difficulty of timing synchronization on the receiving side. It is, therefore, difficult to apply comparative example 1 to digital broadcasting.

Figure 6:
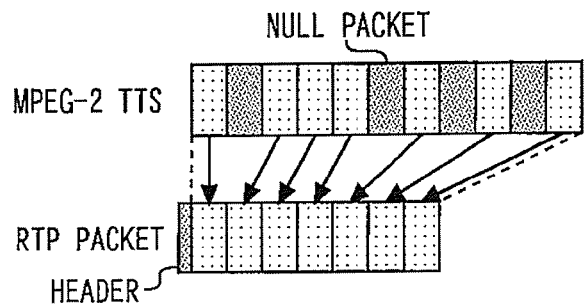
FIG. 6 is a diagram showing an example of preparation of an RTP packet according to a method in comparative example 2.
Figure 7:
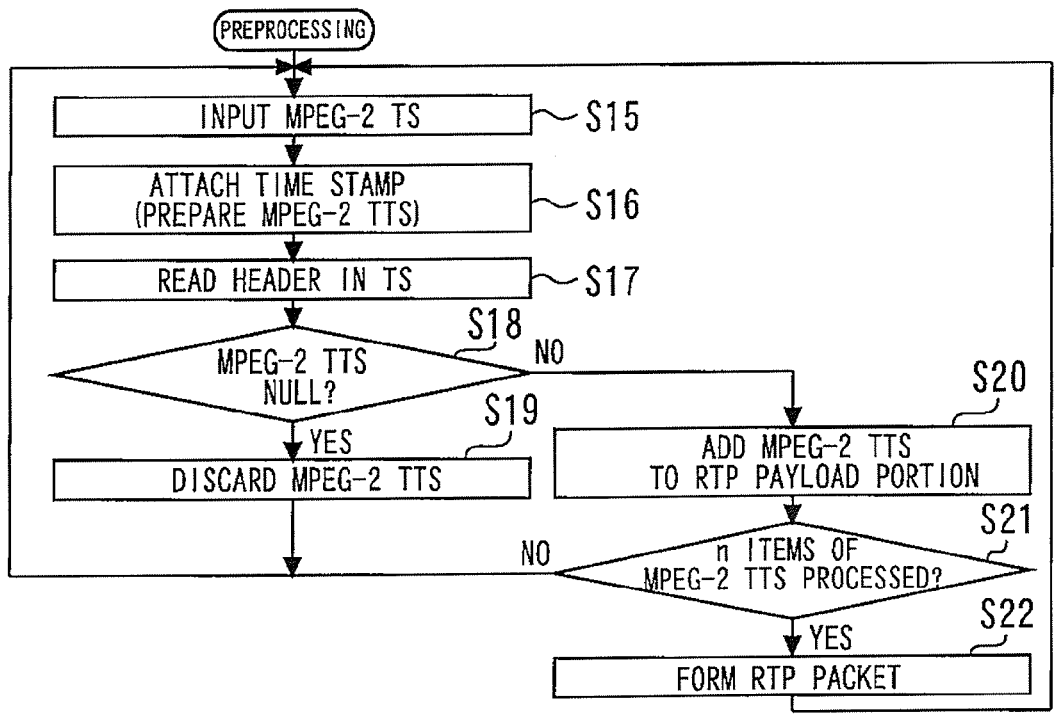
FIG. 7 is a flowchart of a digital broadcast method according to comparative example 2.

FIG. 6 is a diagram showing an example of preparation of an RTP packet according to a method in comparative example 2. FIG. 7 is a flowchart of a digital broadcast method according to comparative example 2. In comparative example 2, an MPEG-2 TS is converted into an MPEG-2 TTS by attaching a time stamp to each packet in the MPEG-2 TS, and the MPEG-2 TTS is transmitted to the communication line 3 (steps S15 to S22). Therefore, even if the timing and order of the MPEG-2 TTS packets received by the receiver 2 deviate from those on the transmitting side, the receiver 2 can re-array the packets in the correct order by correct timing. That is, the receiver 2 can accurately synchronize the timing and order from the time stamps in the MPEG-2 TTS. Therefore, the transmitter 1 can delete null packets, and the average rate of data transfer through the communication line 3 can be substantially reduced.

In comparative example 2, however, null packets are deleted and non-null MPEG-2 TTS packets are packed to the upper limit of each RTP packet. Therefore, preparation timing variations of RTP packets occur on the transmitting side and there is a need to secure a buffer and absorb arrival time variations of the RTP packets on the receiving side. Further, the delay time of the receiving side is increased.

In the present embodiment, a predetermined number of packets including null packets are collected to form a group, the null packets are removed from the group, and the remaining MPEG-2 TTS packets are closely packed by shifting some of the MPEG-2 TTS packets frontward. The group of MPEG-2 TTS packets is thereby converted into an RTP packet. RTP packets are formed at constant intervals in this way. As a result, the need for an additional buffer on the receiving side is eliminated and the delay time on the receiving side can be reduced. Even when no non-null MPEG-2 TTS packets exist in one group, an RTP packet is formed for the group. Variations in entire length of RTP packets therefore result. With such a state, there is no problem in terms of specification.

Figure 8:
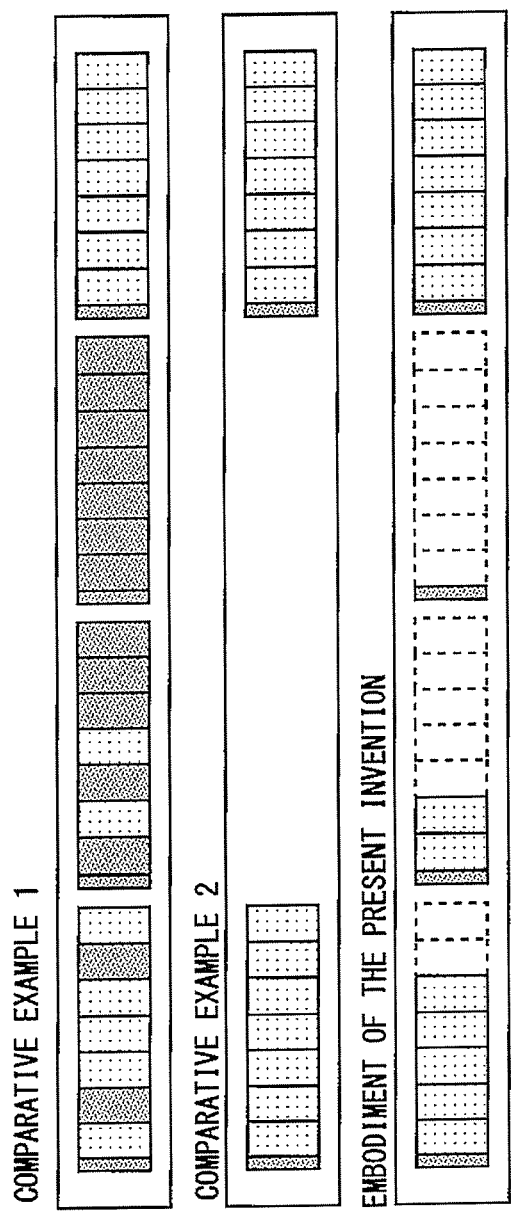
FIG. 8 is a diagram showing examples of preparations of RTP packets respectively made by the methods in the embodiment of the present invention and comparative examples 1 and 2.

FIG. 8 is a diagram showing examples of preparations of RTP packets respectively made by the methods in the embodiment of the present invention and comparative examples 1 and 2. In comparative example 1, packets including null packets are formed into an RTP packet and, therefore, the transfer load is large. In comparative example 2, the transfer load is reduced by deleting null packets but preparation timing variations of RTP packets occur. Therefore, the RTP packets do not arrive at constant intervals on the receiving side. As a result, an additional buffer is required and the delay time is increased. In the present embodiment, the transfer load is substantially the same as that in comparative example 2, and the timing of preparation of RTP packets is substantially the same as that in comparative example 1. In the present embodiment, therefore, the need for an additional buffer on the receiving side is eliminated; the delay time on the receiving side can be reduced; and the average rate of data transfer through the communication line can be substantially reduced.

DESCRIPTION OF SYMBOLS 1 transmitter
2 receiver
3 communication line
5 TTS preparation processing section
6 grouping section
7 null packet removal section
8 transmitting section

The invention claimed is:
1. A digital broadcast method, comprising:
attaching, by a Time-stamped Transport Stream (TTS) preparation processing section of a transmitter, a time stamp to each of packets in an Moving Picture Experts Group-2 (MPEG-2) Transport Stream (TS) to convert the MPEG-2 TS into an MPEG-2 TTS;
collecting, by a grouping section of the transmitter, a predetermined number of packets in the MPEG-2 TTS to form a group;

removing, by a null packet removal section of the transmitter, a null packet from the group;

shifting, by a transmitting section of the transmitter, the MPEG-2 TTS packets in the group, from which the null packet has been removed, frontward to convert the group into an Real-time Transport Protocol (RTP) packet;

forming the RTP packet with a zero payload upon detecting that all of grouped packets are null; and transmitting the RTP packet to a communication line.

2. A digital broadcast system, comprising:

at least one transmitter, comprising:

a Time-stamped Transport Stream (TTS) preparation processing section configured to attach a time stamp to each of packets in an Moving Picture Experts Group-2 (MPEG-2) Transport Stream (TS) to convert the MPEG-2 TS into an MPEG-2 TTS;

a grouping section configured to collect a predetermined number of packets in the MPEG-2 TTS to form a group;

a null packet removal section configured to remove a null packet from the group; and a transmitting section configured to:

shift the MPEG-2 TTS packets in the group, from which the null packet has been removed, frontward to convert the group into an Real-time Transport Protocol (RTP) packet, form the RTP packet with a zero payload upon detecting that all of grouped packets are null, and transmit the RTP packet to a communication line.

\* \* \* \* \*